United States Patent

Vargas et al.

[11] Patent Number: 5,995,699
[45] Date of Patent: Nov. 30, 1999

[54] FIBER OPTIC CABLE RACEWAY SYSTEM CROSS REFERENCE TO RELATED APPLICATIONS

[75] Inventors: Antonio J. Vargas, Tolland; Jeffrey D. Hemingway, Burlington, both of Conn.

[73] Assignee: The Wiremold Company, West Hartford, Conn.

[21] Appl. No.: 09/302,095

[22] Filed: Apr. 29, 1999

Related U.S. Application Data

[63] Continuation of application No. 09/003,012, Jan. 5, 1998, Pat. No. 5,917,982.

[51] Int. Cl.⁶ ...................................................... G02B 6/00
[52] U.S. Cl. .............................................................. 385/134
[58] Field of Search ...................................... 385/134, 147, 385/135, 99, 106, 136; 439/99

[56] References Cited

U.S. PATENT DOCUMENTS 5,440,665  8/1995  Ray et al. ................................. 385/135
5,917,982  6/1999  Vargas et al. ............................. 385/134

*Primary Examiner*—Akm E. Ullah
*Attorney, Agent, or Firm*—McCormick, Paulding & Huber

[57] ABSTRACT

Two piece metal raceway (base and cover sections) accommodate not only fiber optic cable at 90 degree corner assemblies, that includes divider means defining a second wireway channel along side a first channel or wireway accommodating the fiber optic cable. The curved walls of the corner assembly base have a radius of two inches or more, and these walls include slots which receive tabs that may be spot welded and/or riveted to provide a permanent connection between the divider element and the raceway base corner fitting.

7 Claims, 2 Drawing Sheets

FIBER OPTIC CABLE RACEWAY SYSTEM

CROSS REFERENCE TO RELATED APPLICATIONS

CROSS REFERENCE TO RELATED APPLICATIONS

This application is a Continuing Application based in part upon a prior application of the same title filed Jan. 5, 1998 in the names of two inventors one of which is the inventor herein, Anthony J. Vargas. That application FIBER OPTIC CABLE CAPABLE METAL RACEWAY SYSTEM Ser. No. 09/003,012 is incorporated by reference herein, and has since issued as U.S. Pat. No. 5,917,982 on Jun. 29, 1999.

SUMMARY OF THE INVENTION

The present invention relates to an improvement over the disclosure in the above-identified co-pending U.S. patent application which is incorporated by reference herein. Whereas the earlier co-pending application describes a raceway incorporating corner assemblies providing a generous bend radius for fiber optic cable and the like, the present invention relates more specifically to raceways adapted to accommodate segregated fiber optic cables or other data communication cables wherein separate groups are segregated in at least two wireway channels provided for this purpose in the raceway.

More particularly, the present invention entails permanently attaching a divider in the base fitting of the raceway corner assembly. Preferably, and as shown in this application a permanent connection is provided between the divider and the corner assembly base by spot welding and/or riveting these components into permanently assembled relationship to one another.

The chief aim of the present invention is to provide a more rigid structure than that offered in the above-identified co-pending patent application, and to save time on the part of the installer when the various components of the present invention are installed at a particular job site.

DETAILED DESCRIPTION

Figure 1:
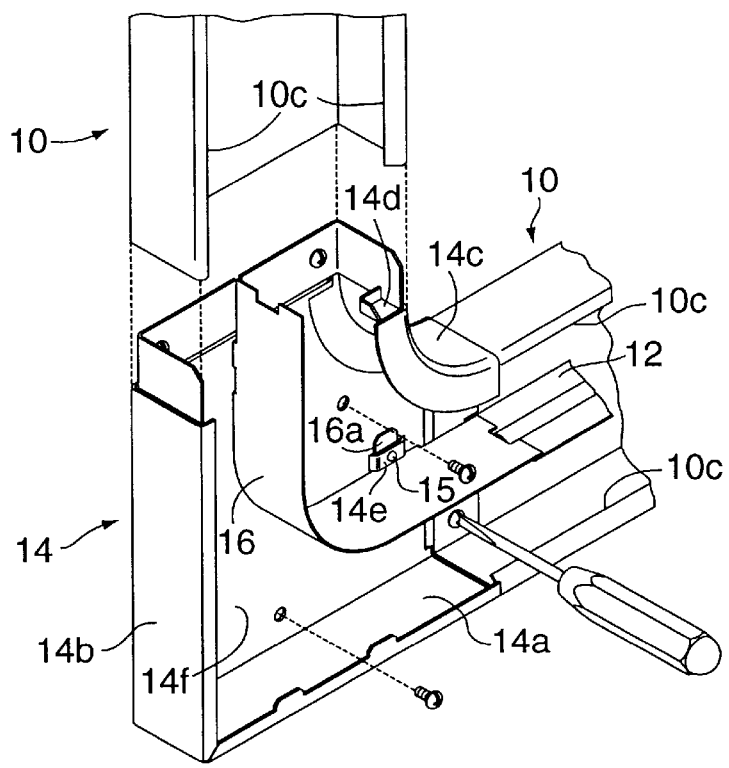
FIG. 1 is a perspective view of a flat elbow corner assembly base in the process of being installed with a vertically extending raceway base, and a horizontally extending raceway base already in place. A curved or arcuate divider wall is provided in the raceway corner base.

Turning now to the drawings in greater detail, FIG. 1 shows a flat elbow corner assembly base 14 constructed in accordance with the present invention, and assembled with two mutually perpendicular metal raceway base members indicated generally at 10, 10. One of these raceway base members is mounted vertically and the other horizontally, the latter also having a conventional divider strip 12 which is mounted therein by clips (not shown) which clips fit within the channel shaped raceway base member and span the back wall of the base with end portions received inside the flanges 10c, 10c provided for this purpose in each raceway base 10.

As indicated by the broken lines in this view the vertically oriented raceway base can be slid onto the end portion of the raceway corner assembly base fitting 14. This corner assembly base fitting 14 includes mutually perpendicular side walls 14a and 14b that are aligned with the sidewalls of the raceway base members 10, 10. Each of the raceway base members 10 has inturned marginal flanges 10c for receiving the flanged raceway cover members 100, 100 all as described in greater detail in the above-identified co-pending patent application which is incorporated by reference herein.

An important feature of the invention disclosed in the prior co-pending case relates to the corner assembly base fitting 14 having a curved sidewall 14c that is designed so that its end portions are oriented tangentially to the sidewalls of the raceway base members 10, 10. It will be apparent that the interior of the corner assembly base fitting 14 can be divided into separate wireways as a result of a divider element 16 which is aligned with the dividers 12 in the raceway base as mentioned previously. Preferably and, as shown, ears 16a are provided at right angles to the arcuate divider wall element 16 for convenience in spot welding these ears to the back wall 14f of the corner assembly base fitting 14. More particularly, and as also shown in the prior co-pending application, slots are formed by portions 14e deformed from this backwall 14f to locate the divider wall when it is spot welded or otherwise secured to the back wall 14f of the corner assembly base fitting 14. These ears 16a on the divider wall 16 may also be riveted to the back wall of the base, and openings provided in the deformed portion of the back wall 14f have rivits 15, 15 provided through these portions of the back wall and through the ears 16a.

Figure 2:
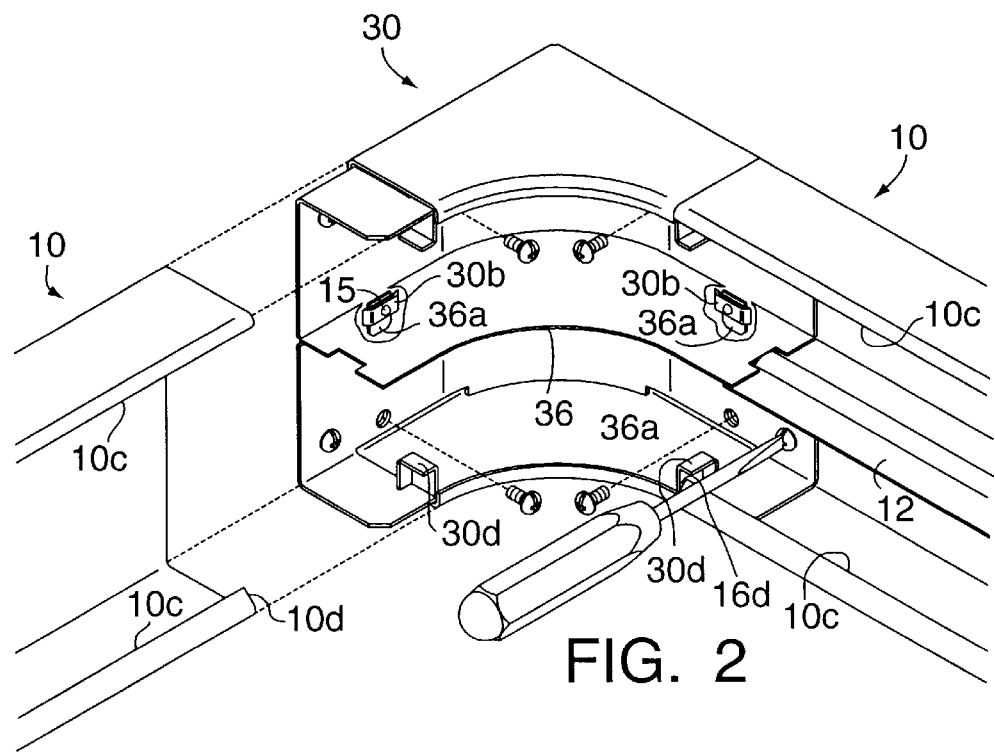
FIG. 2 shows an internal corner assembly base in the process of assembly with mutually perpendicular raceway base components together with a permanently installed raceway divider having an arcuate edge conforming to the arcuate surface afforded by the internal raceway corner base fitting.

Turning now to the embodiment of the invention illustrated in FIG. 2, it will be apparent that mutually perpendicular conventional raceway base members 10, 10 are again provided for assembly with the end portions of a corner assembly base fitting 30, which in this case is designed to be received at an external corner. Like the above described corner assembly base fitting of FIG. 1, opposed end portions of the fitting 14 are of slightly reduced cross section so as to slidably receive the open ends of the raceway base 10. The corner assembly base fitting 30 of FIG. 2 includes a curved side wall 30c which has abutment surfaces 30c for receiving and for covering the relatively sharp edges 10d of the in-turned flanges 10c of the raceway base 10.

The back wall 30c of the channel shaped interior of the corner assembly base fitting 30 provides an inner boundary for the wireway. The corner fitting 30 has a radius of at least two inches so as to safely accommodate fiber optic cables without undo bending of the cable all as described in the above mentioned co-pending patent application. Slots 30b are provided in the back wall 30c of the base fitting 30 so as to receive the ears 36a of the arcuately shaped divider element 36. Preferably, as shown, these ears 36a are welded or otherwise secured to the back wall 30c of the corner fitting 30 in such a way as to align the divider element 36 with the divider walls 12, 12 in the mutual perpendicular raceway base sections 10, 10. Rivets 15,15 may also be used to secure the divider element 36 to the base fitting 30.

As so constructed and arranged the divider elements are provided in the raceway corner fitting 36 to define continuing independently arranged wireways for sets or groups of cabling whether of the fiber optic variety or otherwise.

Figure 3:
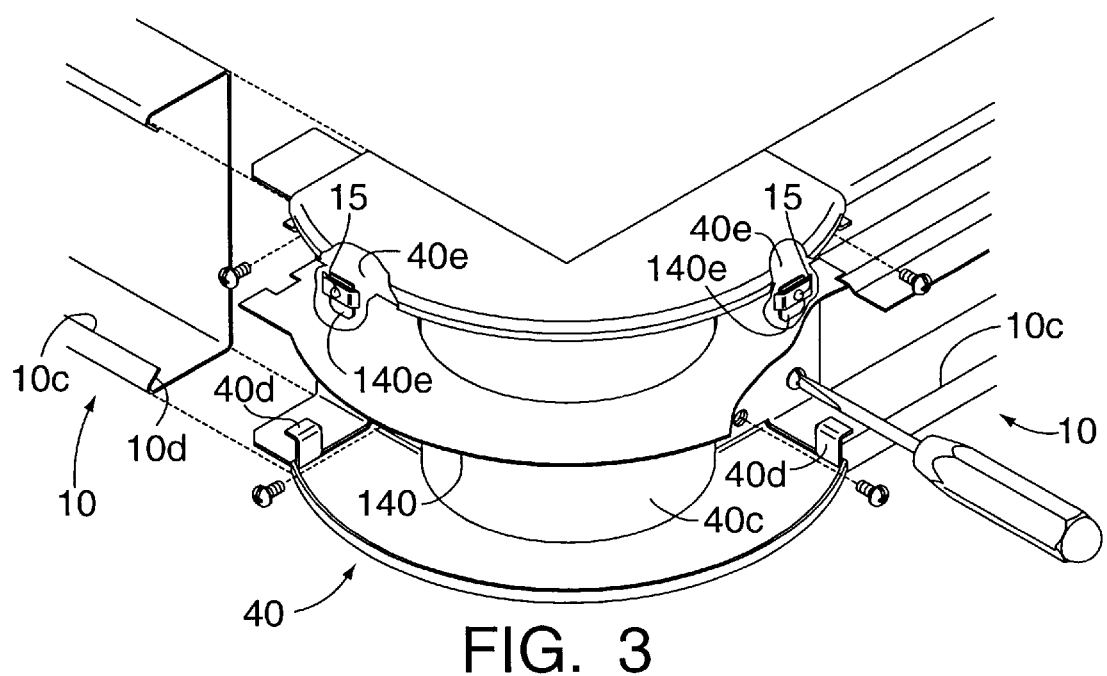
FIG. 3 shows an external corner base with horizontally extending raceway base components arranged perpendicular one another together and a divider wall provided with an arcuate peripheral edge conforming to the arcuate wall defined in the raceway corner base fitting.

Turning next to the embodiment of the invention depicted in FIG. 3, a corner assembly base fitting 40 is shown for use at an external corner, and accommodates horizontally extending raceway base sections 10, 10 all as described previously in the above referenced co-pending commonly assigned patent application. An internal curved side wall 40c includes abutment surfaces 40d at end portions thereof for receiving the inturned flanges 10c of the raceway base 10, and also serves to prevent these flanges and more particularly the sharp edges thereof 10d from interfering with running the fiber optic cable pulled through the wireways defined by the raceway base and cover, and the corner fitting itself.

As in the previously described embodiment a divider element 140 has arcuately shaped peripheral edges, the inside peripheral edge conforming to the arcuate contour of the inner wall 40c of the raceway base fitting 40. As in the previously described embodiments tangs or ears 140e are provided adjacent the end portions of this curved divider element 140 so as to be received in slots provided for this purpose in the end portions of the back wall 40e of the base fitting 40. Preferably, and as suggested in the present disclosure these tangs are not only received in slots provided for this purpose all as described previously in the copending application referred to above, but these ears or tangs are additionally spot welded and/or riveted to the slot defining portions of the back wall 40e all as shown and described previously with respect to the first two embodiments of the invention disclose herein. See rivet heads 15,15.

We claim:

1. A raceway system for routing fiber optic cables along walls or ceiling that require the cables to undergo bends of about 90 degrees, said system comprising:

linear raceway base sections and linear raceway cover sections and raceway dividers defining at least two wireways, said raceway base and cover sections having longitudinally extending flanges projecting inwardly for engagement with one another to hold said raceway cover and base sections in assembled relation, a raceway corner assembly including a base fitting having angularly related first and second end portions for slidably receiving said raceway base sections, and a corner assembly cover fitting that mates with said corner assembly base fitting, said base fitting including a curved sidewall between said first and second end portions, at least one divider element that is shaped to have a radius generally complementary to said curved side wall of said base fitting, and means securing said divider element to said curved sidewall of said base fitting.

2. The system according to claim 1 wherein said corner assembly base fitting end portions are formed to fit inside said raceway base sections, and wherein said raceway base sections include a divider element together with means for securing said divider element in said raceway base section and aligning said divider element with said dividers mounted in said raceway base sections.

3. The system according to claim 2 wherein said means for securing said divider element to said side wall of said corner assembly base fitting comprises a spot weld applied to projecting ear portions of said divider element and said side wall of said corner assembly base fitting.

4. The system according to claim 3 wherein said corner assembly base fitting side wall defines slots for receiving said ears on said divider element.

5. The system according to claim 1 wherein said means for securing said divider element to curved side wall of said corner assembly base fitting includes a riveted connection therebetween.

6. The system according to claim 1 wherein said corner assembly base fitting side wall defines slots for receiving said ears on said divider element.

7. The system according to claim 1 wherein said raceway corner assembly further includes a raceway cover secured to said base fitting, and said corner assembly base fitting having inwardly projecting abutment surfaces for engaging flanges on said raceway base sections to protect fiber optic cables pulled through said wireways, said raceway base flanges cooperating with flanges on said raceway covers to provide a snap together raceway assembly.

\* \* \* \* \*

UNITED STATES PATENT AND TRADEMARK OFFICE
CERTIFICATE OF CORRECTION

PATENT NO. : 5,995,699
DATED : November 30, 1999
INVENTOR(S) : Antonio J. Vargas and Jeffrey D. Hemingway It is certified that error appears in the above-identified patent and that said Letters Patent is hereby corrected as shown below:

On title page, item [54] and column 1, lines 1-3
In the Title: Delete "FIBER OPTIC CABLE RACEWAY SYSTEM CROSS REFERENCE TO RELATED APPLICATIONS" and insert -- FIBER OPTIC CABLE RACEWAY SYSTEM --.

Signed and Sealed this

Twenty-seventh Day of June, 2000

Attest:

Q. TODD DICKINSON

*Attesting Officer*     *Director of Patents and Trademarks*